United States Patent
Pou et al.

(10) Patent No.: US 10,422,043 B2
(45) Date of Patent: Sep. 24, 2019

(54) INHIBITORS OF TOP-OF-LINE CORROSION OF PIPELINES CONVEYING CRUDES FROM EXTRACTION OF HYDROCARBONS

(71) Applicant: CECA S.A., La Garenne Colombes (FR)

(72) Inventors: Tong Eak Pou, Irigny (FR); Stéphane Boito, Saint Genis Laval (FR)

(73) Assignee: ARKEMA FRANCE, Colombes (FR)

( * ) Notice: Subject to any disclaimer, the term of this patent is extended or adjusted under 35 U.S.C. 154(b) by 104 days.

(21) Appl. No.: 15/443,764

(22) Filed: Feb. 27, 2017

(65) Prior Publication Data

US 2017/0218524 A1     Aug. 3, 2017

Related U.S. Application Data

(63) Continuation of application No. 14/344,423, filed as application No. PCT/FR2012/052024 on Sep. 11, 2012, now abandoned.

(30) Foreign Application Priority Data

Sep. 13, 2011 (FR) .................................. 11 58115

(51) Int. Cl.
| | |
|---|---|
| C23F 11/14 | (2006.01) |
| C23F 11/02 | (2006.01) |
| C23F 11/04 | (2006.01) |
| C10G 75/02 | (2006.01) |
| C09K 8/54 | (2006.01) |
| C09K 15/28 | (2006.01) |

(52) U.S. Cl.
CPC ............ C23F 11/141 (2013.01); C09K 8/54 (2013.01); C09K 15/28 (2013.01); C10G 75/02 (2013.01); C23F 11/02 (2013.01); C23F 11/04 (2013.01); C23F 11/14 (2013.01)

(58) Field of Classification Search
None
See application file for complete search history.

(56) References Cited

U.S. PATENT DOCUMENTS

| | | | | |
|---|---|---|---|---|
| 2,582,138 A * | 1/1952 | Lane | ...................... | C23F 11/02 252/180 |
| 3,676,327 A * | 7/1972 | Foroulis | ................. | C23F 11/04 106/14.15 |
| 4,490,275 A * | 12/1984 | Niu | .......................... | C10G 7/10 252/189 |
| 4,493,780 A * | 1/1985 | Schwartz | ................. | C10M 3/00 252/73 |
| 5,853,619 A * | 12/1998 | Watson | .................... | C09K 8/54 208/47 |
| 5,965,785 A * | 10/1999 | Braden | .................... | C10G 7/10 208/184 |
| 5,989,322 A * | 11/1999 | Riggs, Jr. | ................ | C23F 11/18 106/14.14 |
| 6,696,572 B2 * | 2/2004 | Meyer | ..................... | C09K 8/54 548/348.1 |
| 2003/0013893 A1 * | 1/2003 | Meyer | ..................... | C09K 8/54 548/566 |
| 2003/0060372 A1 * | 3/2003 | Fan | .......................... | C02F 1/50 507/117 |
| 2005/0051462 A1 * | 3/2005 | Lack | ...................... | C10G 75/02 208/47 |
| 2007/0261842 A1 * | 11/2007 | Gillet | ....................... | C09K 8/54 166/244.1 |
| 2008/0227669 A1 * | 9/2008 | Welton | .................... | C09K 8/54 507/239 |
| 2009/0149356 A1 * | 6/2009 | Tiwari | .................. | C07D 233/16 507/243 |
| 2010/0056405 A1 * | 3/2010 | Ali | ......................... | C09K 8/528 507/240 |
| 2010/0219379 A1 * | 9/2010 | Acosta | ..................... | C02F 1/68 252/392 |
| 2010/0304018 A1 * | 12/2010 | Achour | .................... | C09K 8/54 427/156 |
| 2012/0220499 A1 * | 8/2012 | Gillet | ....................... | C09K 8/54 507/90 |
| 2014/0343332 A1 * | 11/2014 | Pou | ........................... | C09K 8/54 585/4 |

FOREIGN PATENT DOCUMENTS

| | | |
|---|---|---|
| EP | 0134365 A1 | 3/1985 |
| EP | 0766913 A1 | 4/1997 |
| EP | 0807696 A1 | 11/1997 |

(Continued)

OTHER PUBLICATIONS

International Search Report of PCT/FR2012/052024, with English translation, dated Jan. 1, 2013, 6 pages.

(Continued)

*Primary Examiner* — Joseph D Anthony
(74) *Attorney, Agent, or Firm* — RatnerPrestia

(57) ABSTRACT

The invention relates to a composition for inhibiting corrosion of the upper part (or roof) of a pipeline for conveying wet hydrocarbons, i.e. hydrocarbons comprising a variable amount of water, said composition comprising at least one Amine 1 with vapor pressure greater than or equal to 10 mmHg, and at least one. Amine 2 with vapor pressure greater than or equal to 0.1 mmHg and strictly less than 10 mmHg.
The invention also relates to the use of such a composition, and also to the method of inhibiting top-of-line corrosion employing said inhibitor composition.

22 Claims, No Drawings

(56) References Cited

FOREIGN PATENT DOCUMENTS

| FR | 2475578 A1 | 8/1981 |
| FR | 2791695 A1 | 10/2000 |
| FR | 2875506 A1 | 3/2006 |
| GB | 2084982 A | 4/1982 |
| WO | 2006032774 A1 | 3/2006 |

OTHER PUBLICATIONS

Singer, M., et al., "Sour top-of-the-line corrosion in the presence of acetic acid," Corrosion 67 (2011), 085003 SQQ, 16 pages.
Gunaltun, Y.M., et al., "Control of top of line corrosion by chemical treatment," Nace Corrosion (2001) No. 01033, 20 pages.
Martin, R.L., "Inhibition of vapor phase corrosion in gas pipelines," Nace Corrosion (1997) No. 337, 8 pages.
Andreev, N.N., et al., "Volatile inhibitors for CO2 Corrosion," Nace Corrosion (1998) No. 241, 8 pages.
Schmitt, G., et al., Inhibition of the top-of-the-line corrosion under stratified flow, Nace Corrosion (2001), No. 01032, 20 pages.
http://Corrosion.Curtin.edu.au/Research/TopOfLine.cfm.
Huntsman: "N-ethylmorpholine", 2008.

\* cited by examiner

INHIBITORS OF TOP-OF-LINE CORROSION OF PIPELINES CONVEYING CRUDES FROM EXTRACTION OF HYDROCARBONS

CROSS REFERENCE TO RELATED APPLICATIONS

This application is a continuation of U.S. patent application Ser. No. 14/344,423, filed Mar. 12, 2014, which claims priority to the U.S. National Phase application of PCT International Application No. PCT/FR2012/052024, filed Sep. 11, 2012, and claims priority to French Patent Application No. 1158115, filed Sep. 13, 2011, the disclosures of which are incorporated by reference in their entirety for all purposes.

FIELD OF THE INVENTION

The present invention relates to the area of extraction of hydrocarbons, such as petroleum and/or gas, and relates more particularly to the problems of corrosion of the pipelines used for transporting said hydrocarbons.

BACKGROUND OF THE INVENTION

The hydrocarbons from oilfields most often comprise mixtures of crude oil and gas, with variable amounts of water, forming an aqueous phase in which sour gases, also present in the hydrocarbons, are dissolved at least partially, or even completely.

Under the effect of the differences in pressures and temperatures that occur on raising the hydrocarbons from the deep subterranean strata to the surface, the water present in said hydrocarbons can condense on the inside walls of pipelines, and mainly at the bottom of the pipelines ("Bottom of Line", or "BoL") and at the top of the pipelines ("Top of Line", or "ToL").

This acidic aqueous phase leads to considerable corrosion of pipelines, called "bottom-of-line corrosion" and "top-of-line corrosion" or "TLC".

Top-of-line corrosion (TLC) is a phenomenon of global importance in the crude oil and gas extraction industry, and is particularly a source of problems both for offshore fields and for onshore fields (see for example the works of M. Singer et al. "Sour Top-of-the-Line Corrosion in the Presence of Acetic Acid", Corrosion 67, (2011), 085003 sqq., or: http://corrosion.curtin.edu.au/research/topofline.cfm).

In fact, in conditions of laminar (or stratified) flow of the fluids being transported, and when coupled with conditions of condensation, internal corrosion is very often observed, localized at the top of horizontal pipelines. This corrosion is mainly due to condensation water at the top of the pipelines, which contains dissolved sour, gases, notably hydrogen sulphide ($H_2S$) and carbon dioxide ($CO_2$), but also organic acids, for example acetic acid.

More, precisely, in multiphase pipelines for conveying petroleum and/or wet gas in conditions of stratified, wave or wave-stratified flow, the liquid phase flows in the lower part of the pipeline, whereas the gas phase flows in the upper part of the pipeline.

The gas phase most often contains sour gases, such as $CO_2$, $H_2S$, but also acidic organic gases as well, such as acetic acid. As for the liquid phase, it contains hydrocarbons and an appreciable amount of water.

For protecting the inside wall of the pipeline against corrosion under the action of the acids, it is common practice for a corrosion inhibitor, which mixes with the liquid phase, to be injected in the pipeline, at the outlet from the extracting well. However, in conditions of stratified, wave or wave-stratified flow, only the lower part of the pipeline that is in contact with the liquid phase is effectively protected against corrosion.

Now, at present, higher and higher temperatures are being used for extraction of hydrocarbons, which greatly increases the risks of top-of-line corrosion. In fact, under the action of heat, the water contained in the liquid phase is transformed to steam, which condenses on the inside wall of the roof of the pipelines, which is cooled more or less abruptly by the cold external air and water (notably in the case of submarine pipelines).

This condensation water exerts a considerable corrosive action at the top of the pipelines, thus leading to considerable damage of said pipelines, ranging from simple pitting corrosion, to destruction of the wall and leakage of the hydrocarbons, which is totally unacceptable from the standpoint of protection of the environment. Such damage would lead to considerable economic losses, in terms of decontamination, losses of hydrocarbons, as well as in terms of repair of the damaged pipelines.

Numerous international conferences, gathering together world experts in matters of corrosion of pipelines for hydrocarbons, are regularly organized, and reflect the importance of the problem, notably because few chemical treatments are offered.

There are in fact already various chemical treatments, batch and/or continuous, which may or may not be combined with mechanical treatments, but they find little if any acceptance by industry, notably owing to their rather unsatisfactory effectiveness.

Among the various methods and devices proposed in the past, for preventing, or at least limiting, top-of-line corrosion of pipelines for hydrocarbons, one said method consists of sending into the pipeline one or more scrapers, of slightly smaller section than the internal section of the pipeline and spaced along the pipeline, the space between the scrapers being filled with a plug of inhibitor liquid. Patent application FR 2 791 695 proposes another scraper system, in combination with corrosion inhibitors.

Among the chemical treatments intended to limit corrosion of the carbonic type (due to $CO_2$) and/or of the hydrogen sulphide type (due to $H_2S$), the use of a great many inhibitors is recommended for effectively protecting the metal of the pipelines against one or other of these types of corrosion, by continuous or batch injection into the corrosive fluid, said fluid thus being distributed uniformly along said lines.

However, the treatment conditions prove tricky or even difficult, notably in the case when two or even three of the following parameters are combined: i) laminar (or stratified) flow of the corrosive fluid, cooling of the pipeline through lack of insulation and presence of organic acid (in particular acetic acid) in the liquid phase.

To combat this type of top-of-line corrosion (TLC), Y. M. Gunaltun et al. ("Control of top of line corrosion by chemical treatment", NACE Corrosion, (2001), No. 01033) recommend batch treatment, or treatment by injection, with a long-lasting inhibitor comprising methyl diethanolamine (MDEA), in order to neutralize the acidity of the corrosive aqueous medium of the base matrix (BLC).

However, it was found that this amine does not neutralize the acidity of the condensate (droplets of condensed water) on the inside of the roof of said pipelines.

R. L. Martin, in "Inhibition of Vapor Phase Corrosion in gas pipelines", NACE Corrosion, (1997), No. 337, and N. N.

Andreev et al., in "Volatile Inhibitors for CO$_2$ Corrosion", NACE Corrosion, (1998), No. 241, proposed volatile corrosion inhibitors (VCI) at very high dosage (of the order of several percent).

G. Schmitt et al., in "Inhibition of the top of line corrosion under stratified flow", NACE Corrosion, (2001), No. 01032, proposed the use of a so-called "creeping" inhibitor introduced into the corrosive medium like a conventional inhibitor. Owing to its very low surface tension, this type of inhibitor is said to creep along the wall to the top of the interior of the pipeline (twelve o'clock position), thus inhibiting top-of-line corrosion.

International application WO 2006/032774 describes inhibitors of top-of-line corrosion of pipelines for hydrocarbons, which are effective but can be further improved.

However, none of these known solutions provides, a suitable and really effective solution to the problem of top-of-line corrosion of pipelines for hydrocarbons used for extraction of hydrocarbons, such as petroleum and/or gas.

There is therefore a real need, reflected in constant pressure from industry, for new solutions and new treatments for effectively combating top-of-line corrosion of hydrocarbon pipelines.

SUMMARY OF THE INVENTION

The present invention proposes to solve the problem of top-of-line corrosion of metal pipelines, notably made of steel, used in the extraction of hydrocarbons, and in which corrosive fluids circulate and/or are present (i.e., water containing CO$_2$ and/or H$_2$S and/or one or more organic acids, generally acetic acid).

Thus, according to a first aspect, the present invention relates to a composition for inhibiting corrosion of the upper part (or top) of a pipeline for conveying wet hydrocarbons, i.e. hydrocarbons having a variable amount of water.

DETAILED DESCRIPTION OF THE INVENTION

The composition according to the present invention comprises specific amine compounds which, once introduced into the corrosive medium by injection, in continuous, batch or "squeeze" mode, preferably continuously, on the one hand neutralize the acidity of the corrosive medium in the phase where there is laminar flow and on the other hand are transformed to the vapour phase for neutralizing the acidity of the water droplets that have condensed (condensate) on the upper part of the interior roof of the pipeline conveying the extracted hydrocarbons.

More precisely, the present invention relates to a composition for inhibiting top-of-line corrosion, comprising:
- from 1% to 30%, preferably from 5% to 20%, of at least one first amine (Amine 1) with vapour pressure greater than or equal to 10 mmHg (1.33 kPa), measured at 20° C.;
- from 5% to 50%, preferably from 15% to 45%, of at least one second amine (Amine 2) with vapour pressure greater than or equal to 0.1 mmHg 13.3 Pa) and strictly less than 10 mmHg (<1.33 kPa), measured at 20° C.;
- from 0 to 30%, preferably from 5% to 20%, of at least one sulphur-containing additive, selected from the mercapto-acids and the mercapto-alcohols;
- from 0 to 60%, preferably from 0 to 50% of at least one alkanolamine; and
- optionally at least one solvent, in a sufficient quantity (q.s.) to reach 100%.

Unless stated otherwise, all percentages (%) mentioned in the present description are % by weight.

According to one aspect of the present invention, Amine 1 corresponds to the following formula (1):

(1)

in which:
R$^{1a}$ is selected from linear or branched, saturated or partially or fully unsaturated hydrocarbon chains, comprising from 1 to 6 carbon atoms, and optionally one or more oxygen atoms in the chain,
R$^{1b}$ and R$^{1c}$, which may be identical or, different, are selected, independently of one another, from the hydrogen atom and linear, branched or cyclic, saturated or partially or fully unsaturated hydrocarbon chains, comprising from 1 to 6 carbon atoms, and optionally one or more heteroatoms selected from oxygen, nitrogen and sulphur, in the chain.

Amine 1 is as a general rule regarded as a "non-fatty" amine, and advantageously comprises fewer than 8 carbon atoms in total. Preferably, in Amine 1, R$^{1c}$ represents the hydrogen atom, or an alkyl group, preferably selected from methyl, ethyl, n-propyl and iso-propyl.

In general, all the amines represented by the above formula (1) may be suitable, provided that the vapour pressure of said Amine 1 is greater than or equal to 10 mmHg, measured at 20° C.

As non-limiting examples for purposes of illustration, Amine 1 can be selected from MOPA (methoxy-3-propylamine) and EDIPA (N,N-diisopropylethylamine), the respective vapour pressures of which are 11 mmHg and 12 mmHg.

As MOPA is an easily accessible amine and is readily available commercially, this represents an Amine 1 that is quite especially preferred for economic reasons, but other amines having the same characteristics may be equally suitable.

According to another aspect of the present invention, Amine 2 corresponds to the following formula (2):

(2)

in which:
R$^{2a}$ is selected from linear, branched or cyclic, saturated or partially or fully unsaturated hydrocarbon chains, comprising 1 to 12 carbon atoms, and optionally one or more heteroatoms selected from oxygen, nitrogen and sulphur, in the chain.
R$^{2b}$ and R$^{2c}$, which may be identical or different, are selected, independently of one another, from the hydrogen atom and linear, branched or cyclic, saturated or partially or fully unsaturated hydrocarbon chains, comprising 1 to 12 carbon atoms.

Amine 2 is as a general rule regarded as a "fatty" amine, and advantageously comprises at least 8 carbon atoms in total. Preferably, in Amine 1, R$^{2c}$ represents the hydrogen atom, or an alkyl group, preferably selected from methyl, ethyl, n-propyl and iso-propyl. Amines 2 are further preferred in which $R^{2b}$ represents a linear chain of formula —[(CH$_2$)$_2$—NH]$_n$—H, where n varies from 0 to 10, preferably from 0 to 5, more preferably from 0 to 3.

In general, all the amines represented by the above formula (2) may be suitable, provided, that the vapour pressure of said Amine 2 is greater than or equal to 0.1 mmHg and is strictly less than 10 mmHg, at 20° C.

As non-limiting examples for purposes of illustration, Amine 2 can be selected from primary alkyl amines having from 8 to 22 carbon, atoms, and more particularly from octylamines, nonylamines, decylamines, undecylamines and dodecylamines. N-Octylamine, whose vapour pressure is 1 mmHg at 20° C., represents an Amine 2 that is quite especially preferred for the compositions of the present invention.

The compositions according to the present invention comprise optionally but advantageously at least one sulphur-containing additive, selected from mercapto-acids, mercapto-alcohols, and others, as well as mixtures of two or more of them in all proportions.

Non-limiting examples of these sulphur-containing additives that can advantageously be present in the composition of the invention are mercapto-ethanol, mercapto-propanol, thioglycolic acid, mercaptopropionic acid, just to mention the more readily available among them, thioglycolic acid being quite particularly preferred.

The compositions according to the present invention can also comprise at least one amine participating in neutralization of condensed water. Said amines are selected advantageously from water-soluble liquid amines, and preferably from alkanolamines, for example monoethanolamine, diethanolamine, triethanolamine, and others, as well as mixtures of two or more of them in all proportions.

According to another preferred aspect, the composition according to the present invention also comprises at least one solvent, generally selected from water, water-soluble organic solvents and mixtures of water and water-soluble organic solvent(s).

Among the water-soluble organic solvents, we may mention alcohols and ethers in particular, among which alcohols and glycols are preferred, for example such as, non-exhaustively, those selected from methanol, ethanol, glycol, monoethylene glycol (MEG), diethylene glycol (DEG), triethylene glycol (TEG), 2-butoxyethanol, and mixtures of two or more of them in all proportions.

According to yet another aspect, the compositions of the present invention that have just been defined can be used alone, mixed or in a formulation with one or more other inhibitors, intended for inhibiting other types of corrosion encountered in the area of extraction of hydrocarbons, for example bottom-of-line corrosion (BLC).

As examples of inhibitors of bottom-of-line corrosion, we may mention amine compounds, which are preferably completely water-soluble, so that after they are injected, these products are in the aqueous phase at the bottom of the pipeline. Advantageously, these inhibitors of BLC must not promote formation of oil-in-water emulsion or formation of foam. As so-called conventional inhibitors of bottom-of-line corrosion, we may for example mention imidazolines and/or derivatives thereof and/or phosphoric esters and/or thioacids. These bottom-of-line inhibitors are generally used at concentrations in the range from 10 ppm to 50 ppm by weight per part by volume of fluid to be treated.

Among the preferred imidazolines, we may mention those resulting from the condensation reaction between a fatty acid (or a mixture of fatty acids) of formula RCOOH where R is a linear or branched alkyl chain comprising from 12 to 22 carbon atoms, and a polyalkylene-polyamine whose number of carbons can vary from 4 to 20, for example DETA (diethylenetriamine), TETA (triethylenetetramine), TEPA (tetraethylenepentamine) or PEHA (pentaethylenehexamine) corresponding to the following formula:

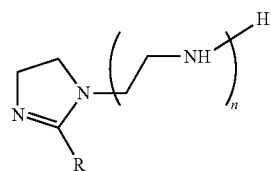

in which R is as defined above and n takes the values 1 to 10, inclusive.

According to another aspect, ethoxylated imidazolines, having from 1 to 20 oxyethylene units are preferred.

The inhibitor compositions according to the present invention can be used pure (100% of corrosion inhibiting active substances) or diluted or in emulsion or suspension, in one or more solvents, such as have been described above.

The compositions according to the present invention can further comprise one or more other additives, fillers, and others that are inert with respect to the effectiveness of the inhibitors of top-of-line corrosion present in said compositions.

Said additives are well known by a person skilled in the art, and among these, we may mention, non-exhaustively, stabilizers, preservatives, anti-UV agents, fireproofing agents, solvents, colorants, and others.

The compositions according to the invention can be prepared by any known means, and in general by simple mixing of the various components of said compositions in any order. However, preferably Amine(s) 1 and Amine(s) 2 are mixed, with stirring, and then the other optional components.

The corrosion inhibiting compositions according to the present invention thus find highly advantageous application in the area of protection against top-of-line corrosion of hydrocarbon pipelines conveying gas, crude oil, gas and crude oil, mixed with a variable amount of water. The use of the compositions according to the invention as have just been defined for inhibiting top-of-line corrosion of said pipelines thus forms another object, of the present invention.

These compositions can be injected by all methods that are well known by a person skilled in the art, in continuous, batch or squeeze mode, preferably continuously, in the lines for extraction of said hydrocarbons, in the lines for injecting production water, and generally in any aqueous, organic or aqueous-organic fluid employed in fields where hydrocarbons are extracted. For example, these compositions can also be injected using the so-called "gas-lift" system, which is well known by a person skilled in the art.

The inhibitor compositions are used, preferably in continuous treatment, at a rate from 100 ppm to 10 000 ppm, expressed as weight of the corrosion inhibiting composition per part by volume of corrosive fluids to be treated.

According to another object, the present invention relates to a method of inhibiting top-of-line corrosion of a pipeline conveying wet gas and/or wet multiphase crude oil, comprising a liquid phase flowing along the lower portion of the pipeline and a gas phase flowing along the upper portion of the pipeline, said method comprising at least one step of introduction, in continuous, batch or squeeze mode, preferably continuously, of at least one corrosion inhibiting composition as defined above into said pipeline.

In the method of the invention, the inhibitor compositions are injected, preferably in continuous treatment, at a rate from 100 ppm to 10 000 ppm, expressed as weight of the corrosion inhibiting composition per part by volume of corrosive fluids to be treated.

The method according to the present invention, which is a chemical treatment employing at least one composition for inhibiting top-of-line corrosion as defined above, can also comprise the application of one or more physical treatments, notably by means of scrapers, as described for example in patent application FR 2 791 695.

Another aspect of the present invention is implemented using at least one composition for inhibiting top-of-line corrosion of pipelines for hydrocarbons used in the extraction of gas and/or of petroleum, said at least one composition being as defined above in the present description, with one or more physical (i.e. mechanical) treatments, for example treatments using scrapers, and others.

The embodiments that have been described above are just examples among the numerous possibilities that a person skilled in the art will be able to imagine. They have only been given to assist in understanding the principle of the invention, which consists of using at least one composition for inhibiting top-of-line corrosion of pipelines used for extraction of hydrocarbons, said composition comprising at least one Amine 1 and at least one Amine 2.

Thus, the following examples are intended to illustrate the present invention, but without limiting its scope, which is defined by the appended claims.

EXAMPLES

Methods of Measurement of Anticorrosion Effectiveness:

Anticorrosion effectiveness is expressed in the form of the rate of corrosion of a carbon steel as a function of time. The rate of corrosion of a steel is determined by the method called LPR ("Linear Polarization Resistance"). In the presence of a corrosion inhibiting composition, the lower the rate of corrosion, the more effective the corrosion inhibiting composition.

The effectiveness of the corrosion inhibiting composition is expressed as percentage effectiveness, according to the following relation:

$$\% \; Eff\,(IC) = \frac{[(Vcor1) - (Vcor2)]}{(Vcor1)} \times 100$$

where: % Eff (IC) represents the percentage effectiveness of the corrosion inhibiting composition, $Vcor_1$ represents the rate of corrosion in the absence of the corrosion inhibiting composition and $Vcor_2$ represents the rate of corrosion in the presence of the corrosion inhibiting composition.

However, it is common practice in the area of corrosion protection only to consider the residual corrosion rate (i.e. after treatment or after injection of the corrosion inhibiting composition). The lower this residual corrosion rate, the higher the effectiveness of the corrosion inhibiting composition. An effective corrosion inhibiting composition, at a given dose, generally displays protection equal to at least 90%.

Example 1: Evaluation of Anticorrosion Capacity a) With "Control" Inhibitor Composition Top-of-line corrosion was simulated in the laboratory in harsher conditions than those encountered at the sites where the hydrocarbons are extracted.

Demineralized water containing 500 ppm (volume/volume) of glacial acetic acid is heated in a flask, up to a temperature of 85° C. This temperature is maintained in the flask.

Then carbon dioxide ($CO_2$) is bubbled into the water at 85° C., at a rate of 63 mL/hour. The carbon dioxide leads to evaporation of the water, the condensate of which is recovered and then fed into a corrosion measuring cell, where it is again saturated with carbon dioxide by bubbling with $CO_2$ and heated to 60° C.

This cell is also equipped with a system for measuring the rate of corrosion, by measurement of polarization resistance, of steel in contact with the condensate. A "control" curve is obtained (without inhibitor), where it is observed that the rate of corrosion (Vcor) increases with time. The duration of the experiment is fixed at 20 hours.

b) With "Comparative" Inhibitor Composition

A similar test is performed with an inhibitor of top-of-line corrosion mainly comprising MOPA (Amine 1), according to the teaching of international application WO 2006/032774.

Demineralized water containing 500 ppm of acetic acid is heated in a flask, at 85° C. It is maintained at this temperature, then $CO_2$ is bubbled through at a rate of 63 mL/hour. The bubbling with $CO_2$ leads to evaporation of the water at 85° C.

At the start of evaporation of the water by the $CO_2$, 500 ppm of the Comparative composition is added, and the curve of the rate of corrosion (Vcor) as a function of time is plotted at a temperature of 60° C.

c) With Inhibitor Compositions According to the Invention

Similar tests to those described above are performed with compositions A, B and C according to the invention, whose characteristics, as well as those of the Control and Comparative compositions, are summarized in Table 1 below, in which the percentages are expressed by weight:

TABLE 1

| Composition | Control | Comparative | A | B | C |
|---|---|---|---|---|---|
| MOPA | — | 80 | 10 | 10 | 10 |
| Octylamine | — | — | 35 | 35 | 35 |
| TGA | — | — | 10 | — | 10 |
| MEA | — | — | — | 40 | 40 |
| 2-Butoxy-ethanol | — | 1.5 | 40 | 10 | — |
| Water | — | 14 | — | — | — |
| Imidazoline 4900 | — | 1.5 | 5 | 5 | 5 |
| Imidazoline 4912 | — | 3 | — | — | — |

MOPA (methoxy-3-propylamine) is supplied by the company Arkema, as are MBA (monoethanolamine) and TGA (thioglycolic acid). The octyl amine (Amine 2) is supplied by Clariant. The imidazolines 4900 and 4912 are inhibitors of bottom-of-line corrosion supplied by CECA S.A. 2-Butoxyethanol (supplied by Brenntag) is used as solvent of the compositions.

d) Results

Table 2 below presents the results for the rate of corrosion (Vcor) after 20 hours of experiment, obtained with each of the compositions: Control, Comparative, and A, B and C according to the invention.

TABLE 2

| Composition | Control | Comparative | A | B | C |
|---|---|---|---|---|---|
| Rate of corrosion (mm/year) | 1 | 0.70 | 0.15 | 0.38 | 0.09 |
| % protection | 0 | 30 | 85 | 62 | 91 |

It can be seen that in a corrosive medium (condensed water containing 500 ppm of acetic acid), the rate of corrosion "without inhibitor" is 1 mm/year. In the presence of 500 ppm of an Amine 1 (Comparative composition), the residual corrosion rate is 0.70 mm/year. The percentage protection is 30%, whereas an inhibitor of top-of-line corrosion is considered to be effective once it provides an effectiveness of protection above about 90%.

In the presence of 500 ppm of Composition C, comprising an Amine 1 and an Amine 2, it is observed that the residual corrosion rate is 0.09 mm/year, which corresponds' to a percentage protection of the order of 91%.

Table 2 compares the effectiveness of the compositions for inhibiting top-of-line corrosion according to the invention. It can be seen that each of the compositions of the invention, comprising an Amine 1 and an Amine 2, are more effective, in terms of inhibition of top-of-line corrosion, than the reference composition comprising only an Amine 1 and no Amine 2.

The invention claimed is:

1. Composition for inhibiting top-of-line corrosion, comprising:
   from 1% to 30% by weight of at least one first amine (Amine 1) with vapour pressure greater than or equal to 10 mmHg (1.33 kPa), measured at 20° C.;
   from 5% to 50% by weight of at least one second amine (Amine 2) with vapour pressure greater than or equal to 0.1 mmHg (≥13.3 Pa) and less than 10 mmHg (<1.33 kPa), measured at 20° C.;
   from 5% to 20% by weight of at least one sulphur-containing additive, selected from mercapto acids and mercapto-alcohols;
   from 0 to 60% by weight of at least one alkanolamine; and optionally at least one solvent, in a sufficient quantity (q.s.) to reach 100%.

2. Composition according to claim 1, wherein Amine 1 corresponds to the following formula (1):

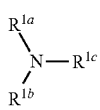

(1)

wherein:
   $R^{1a}$ is selected from linear or branched, saturated or partially or fully unsaturated hydrocarbon chains, comprising from 1 to 6 carbon atoms, and optionally one or more oxygen atoms in the chain, and
   $R^{1b}$ and $R^{1c}$, which may be identical or different, are selected, independently of one another, from a hydrogen atom and linear, branched or cyclic, saturated or partially or fully unsaturated hydrocarbon chains, comprising from 1 to 6 carbon atoms, and optionally one or more heteroatoms selected from oxygen, nitrogen and sulphur, in the chain.

3. Composition according to claim 1, wherein Amine 1 is selected from MOPA (methoxy-3-propylamine) and EDIPA (N,N-diisopropylethylamine).

4. Composition according to claim 1, wherein Amine 2 corresponds to the following formula (2):

(2)

wherein:
   $R^{2a}$ is selected from linear, branched or cyclic, saturated or partially or fully unsaturated hydrocarbon chains, comprising 1 to 12 carbon atoms, and optionally one or more heteroatoms selected from oxygen, nitrogen and sulphur, in the chain, and
   $R^{2b}$ and $R^{2c}$, which may be identical or different, are selected, independently of one another, from a hydrogen atom and linear, branched or cyclic, saturated or partially or fully unsaturated hydrocarbon chains, comprising 1 to 12 carbon atoms.

5. Composition according to claim 1, wherein Amine 2 is selected from octylamines, nonylamines, decylamines, undecylamines and dodecylamines.

6. Composition according to claim 1, further comprising one or more other inhibitors for inhibiting other types of corrosion encountered in the area of extraction of hydrocarbons.

7. Method of inhibiting top-of-line corrosion of a hydrocarbon pipeline in which gas, crude oil, gas and crude oil circulate, mixed with a variable amount of water, comprising injecting a composition according to claim 1 into the pipeline.

8. Method according to claim 7, wherein the inhibitor composition is injected at a rate from 100 ppm to 10 000 ppm, expressed as the weight of the corrosion inhibiting composition per part by volume of corrosive fluids to be treated.

9. Method of inhibiting top-of-line corrosion of a pipeline conveying wet gas and/or wet multiphase crude oil, comprising a liquid phase flowing along the lower portion of the pipeline and a gas phase flowing along the upper portion of the pipeline, said method comprising at least one step of introducing, in continuous, batch or squeeze mode at least one corrosion inhibiting composition according to claim 1 into said pipeline.

10. Method according to claim 9, wherein the inhibitor composition is injected at a rate from 100 ppm to 10 000 ppm, expressed as weight of the corrosion inhibiting composition per part by volume of corrosive fluids to be treated.

11. Method according to claim 9, further comprising application of one or more physical treatments.

12. Composition according to claim 1, wherein the composition comprises from 5% to 20% by weight of the at least one first amine (Amine 1) with vapour pressure greater than or equal to 10 mmHg (1.33 kPa), measured at 20° C.

13. Composition according to claim 1, wherein the composition comprises from 15% to 45% by weight of the at least one second amine (Amine 2) with vapour pressure greater than or equal to 0.1 mmHg (≥13.3 Pa) and less than 10 mmHg (<1.33 kPa), measured at 20° C.

14. Composition according to claim 1, wherein the at least one sulphur-containing additive is selected from the group consisting of mercapto-ethanol, mercapto-propanol, thioglycolic acid, mercatopropionic acid and mixtures thereof.

15. Composition according to claim 1, wherein the composition comprises from 0 to 50% of the at least one alkanolamine.

16. Composition according to claim 1, wherein Amine 2 is n-octylamine.

17. Composition according to claim 6, wherein the one or more other inhibitor comprises a bottom-of-line corrosion inhibitor.

18. Method according to claim 7, wherein the composition is injected continuously.

19. Method according to claim 9, wherein the at least one corrosion inhibiting composition is introduced continuously.

20. Method according to claim 11, wherein the one or more physical treatments comprise scraping.

21. Composition according to claim 1, wherein the sulphur-containing additive comprises a mercapto-alcohol.

22. Composition according to claim 1, which contains the alkanolamine.

* * * * *